(12) United States Patent
Lu

(10) Patent No.: US 12,440,847 B2
(45) Date of Patent: Oct. 14, 2025

(54) METHODS FOR PROCESSING A PATHOLOGY SPECIMEN

(71) Applicant: GoPath Laboratories LLC, Buffalo Grove, IL (US)

(72) Inventor: Jim Lu, Buffalo Grove, IL (US)

(73) Assignee: GoPath Laboratories LLC, Buffalo Grove, IL (US)

( * ) Notice: Subject to any disclaimer, the term of this patent is extended or adjusted under 35 U.S.C. 154(b) by 0 days.

(21) Appl. No.: 19/024,756

(22) Filed: Jan. 16, 2025

(65) Prior Publication Data

US 2025/0153183 A1    May 15, 2025

Related U.S. Application Data

(63) Continuation of application No. 18/432,939, filed on Feb. 5, 2024.

(Continued)

(51) Int. Cl.
*G01N 1/30* (2006.01)
*B01L 3/00* (2006.01)
(Continued)

(52) U.S. Cl.
CPC ............ *B01L 3/50853* (2013.01); *G01N 1/30* (2013.01); *G16H 30/00* (2018.01); *B01L 2200/04* (2013.01); *B01L 2300/021* (2013.01); *B01L 2300/024* (2013.01); *B01L 2300/025* (2013.01); *B01L 2300/0609* (2013.01); *B01L 2300/0663* (2013.01); *B01L 2300/0809* (2013.01); *G01N 2001/2873* (2013.01); *G01N 2001/368* (2013.01)

(58) Field of Classification Search
CPC ............ G01N 1/36; G01N 1/30; G16H 30/00; G16H 30/40; B01L 3/50853; B01L 3/502
See application file for complete search history.

(56) References Cited

U.S. PATENT DOCUMENTS

2018/0226138 A1* 8/2018 Leavitt .................... G16H 10/40
2020/0408651 A1* 12/2020 Williamson, IV ....... G01N 1/36
2022/0251632 A1* 8/2022 Regier ................. C12Q 1/6806

FOREIGN PATENT DOCUMENTS

WO  WO-2022266459 A1 * 12/2022 ............. G01N 35/04

* cited by examiner

*Primary Examiner* — Elizabeth A Robinson
*Assistant Examiner* — Tingchen Shi
(74) *Attorney, Agent, or Firm* — Morgan, Lewis & Bockius LLP

(57) ABSTRACT

Methods for processing tissue samples are provided. Tissue samples are obtained and disposed into individual compartments of a cassette with an embedded barcode identifier, which is scanned to generate a display screen of digital images and a reference table. Cassettes with tissue samples are stored and shipped in one formalin filled jar to a pathology facility, where the cassettes are removed and wiped of formalin. Digital images of lidless cassettes are generated and measured by a pathology information system. The ends of each tissue sample are color coded and the tissue samples dehydrated. The tissue samples and an orientation dot are embedded in a paraffin block, which is trimmed and mounted to a slide. Digital images of the tissue samples on the slide are generated and stored by the pathology information system. The digital images may be analyzed by a doctor and/or artificial intelligence programs for abnormal pathology.

2 Claims, 15 Drawing Sheets

Related U.S. Application Data

(60) Provisional application No. 63/523,503, filed on Jun. 27, 2023.

(51) Int. Cl.
*G16H 30/00* (2018.01)
*G01N 1/28* (2006.01)
*G01N 1/36* (2006.01)

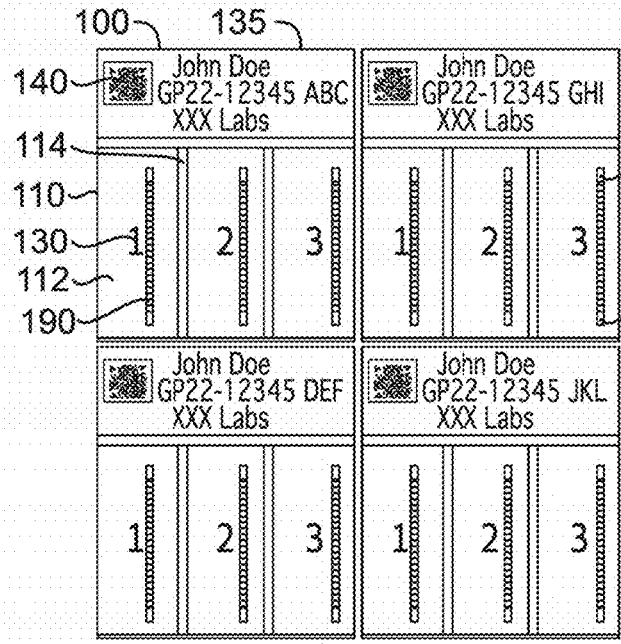
FIG. 9
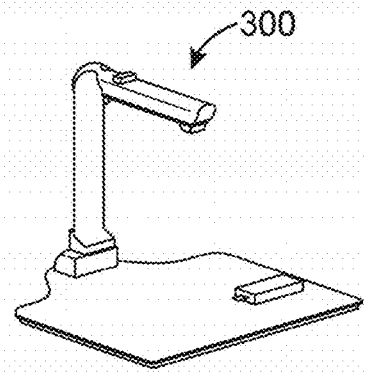
FIG. 10
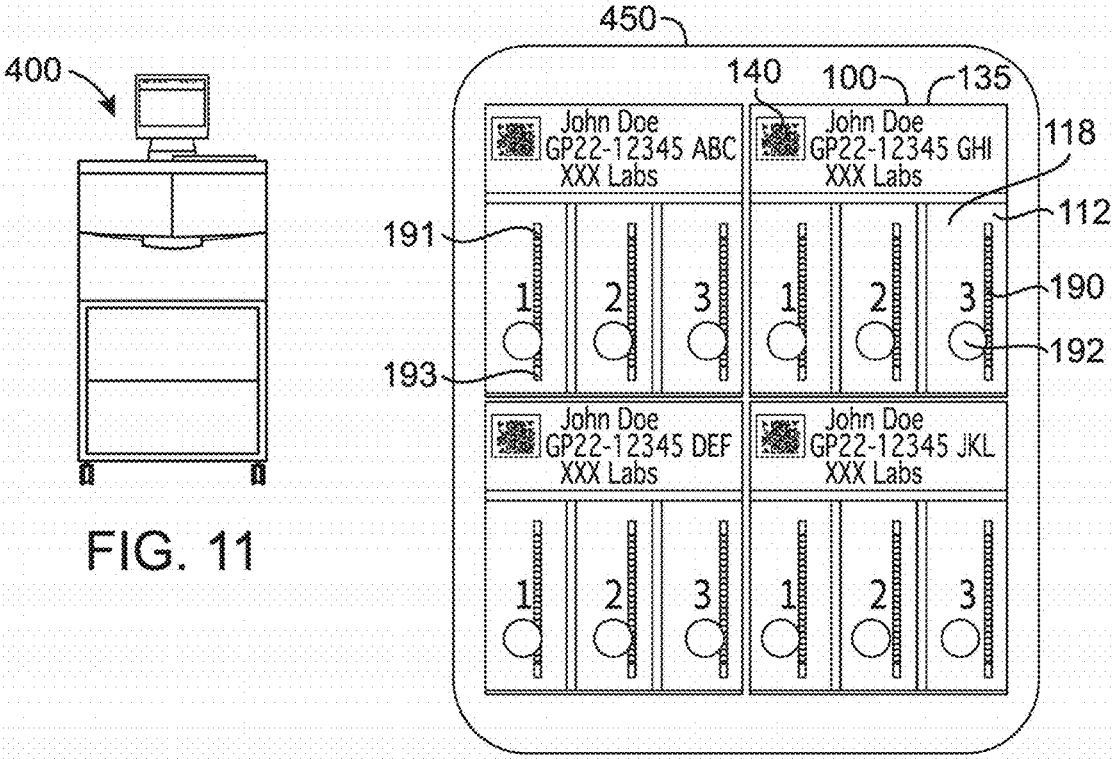
FIG. 11
FIG. 12

METHODS FOR PROCESSING A PATHOLOGY SPECIMEN

CROSS-REFERENCE TO RELATED APPLICATIONS

This application a continuation of U.S. patent application Ser. No. 18/432,939, entitled "SYSTEMS AND METHODS FOR PROCESSING A PATHOLOGY SPECIMEN," filed on Feb. 5, 2024, the entirety of which is incorporated herein by reference.

TECHNICAL FIELD

The present disclosure relates generally to systems and methods for processing pathology specimens, in particular for processing tissue samples in preparation for digital pathology analysis.

BACKGROUND

Pathology samples such as tissue samples are typically obtained from a patient and provided to a lab for analysis. For example, a needle biopsy such as an initial transrectal ultrasound (TRUS) guided prostate biopsy may be performed to obtain prostate tissue core samples or laparoscopic collection may be performed to obtain gastrointestinal tissue samples, which then are sent into a lab for processing and analysis.

Typically, such core samples are transferred from the needle biopsy instrument to a glass jar containing formalin by a doctor or medical technician at the site where the biopsy is performed. The glass jar is then labeled, packaged and sent to a lab for processing. However, the tissue samples tend to move around within the jar during transportation and are immersed in formalin, which may damage the tissue, degrade the tissue integrity and/or alter the orientation of the tissue sample. At the lab, the tissue samples are then removed from the jar, such as with tweezers, and affixed to a glass slide for viewing under a microscope or inserted into a board for digital scanning.

In some cases, the core samples are transferred from the needle biopsy instrument to a shipping board having a trench with a sponge soaked in formalin at the bottom of the trench. The shipping board is then labeled, packaged and sent to the lab for processing. However, here again the tissue samples are soaked in formalin and multiple samples in one trench can get mixed up and/or alter their orientation as the sponge is not strong enough to fix the tissue samples in place within the shipping board. At the lab, the tissue samples are then removed from the trench in the shipping board, such as with tweezers, and inserted into a processing board for digital scanning. Here, the tissue samples must be pushed into a single compartment of the processing board with tweezers or forceps. However, such direct handling may break the tissue sample, allow the tissue sample to be dropped and/or contaminate the tissue sample. In addition, sometimes the tissue sample may be longer than the compartment in the processing board.

Providing for taking the entire contents of a needle biopsy and fixing the resulting tissue sample in place in an individual compartment of a collection cassette without using formalin would provide for better tissue integrity and fixed orientation during transportation. Also, providing for transfer of the tissue samples from the collection cassette to a digital scanning slide without directly touching the tissue samples would provide for better tissue integrity and fixed orientation during pathology processing. Accordingly, there is a need for improved systems and methods of preparing, transporting and processing tissue samples for pathology analysis.

SUMMARY

In one or more embodiments, a method of preparing pathology specimens includes obtaining a plurality of tissue samples from a patient; placing each obtained tissue sample in a separate compartment of a tissue sample cassette; scanning a cassette identifier of the tissue sample cassette; generating a display screen comprising a digital representation of the tissue sample cassette and a definition table corresponding to locations and contents of each compartment of the tissue sample cassette; placing the tissue sample cassette within a storage container containing a storage medium and sealing the storage container; placing the sealed storage container in a shipping container; and sending the shipping container to a pathology processing facility.

In one or more embodiments, a method of processing pathology specimens includes receiving and removing a sealed storage container from a shipping container; unsealing the storage container and removing a tissue sample cassette containing a plurality of tissue samples, each tissue sample disposed in a separate compartment of the tissue sample cassette; scanning, by a receiving station of a pathology information system, a cassette identifier embedded on the tissue sample cassette; printing, by a cassette printer, a patient label on the tissue sample cassette based on information from the scanned cassette identifier; removing a lid from the tissue sample cassette and grossly examining the tissue samples within the compartments for intactness; scanning, by a digital imaging system, the tissue sample cassette with the lid removed; uploading, from the digital imaging system, a digital image of the scanned tissue sample cassette to a gross description module of the pathology information system; color coding, for each tissue sample in the tissue sample cassette, one end of the tissue sample a color and a second end of the tissue sample a different color; placing a sponge over the compartments and closing the lid of the tissue sample cassette; placing the closed tissue sample cassette into a tissue processor to dehydrate contents of the tissue sample cassette; removing the tissue sample cassette from the tissue processor; removing the tissue samples from the removed tissue sample cassette and placing the removed tissue samples and an orientation indicator in an embedding mold; covering the tissue samples and the orientation indicator within the embedding mold with liquid paraffin; solidifying the liquid paraffin to create a paraffin block with the tissue samples and the orientation indicator embedded; trimming the paraffin block; mounting the trimmed paraffin block to a slide having a patient identifier; scanning, with a scanning system, the slide to create a digital image of each tissue sample; and saving, by the pathology information system, the digital images as image files based on information from the patient identifier.

In one or more embodiments, a method of processing pathology specimens includes receiving a tissue sample cassette containing a plurality of tissue samples, each tissue sample disposed in a separate compartment of the tissue sample cassette and covered by a gel; scanning, by a receiving station of a pathology information system, a cassette identifier embedded on the tissue sample cassette; printing, by a cassette printer, a patient label on the tissue sample cassette based on information from the scanned cassette identifier; removing a lid from the tissue sample cassette; scanning, by a digital imaging system, the tissue sample cassette with the lid removed; uploading, from the digital imaging system, a digital image of the scanned tissue sample cassette to a gross description module of the pathology information system; color coding, for each tissue sample in the tissue sample cassette, one end of the gel covering the tissue sample a color and a second end of the gel covering the tissue sample a different color; placing a sponge over the compartments and closing the lid of the tissue sample cassette; placing the closed tissue sample cassette into a tissue processor to dehydrate contents of the tissue sample cassette; removing the tissue sample cassette from the tissue processor; removing the gel covered tissue samples from the removed tissue sample cassette; trimming a portion of the gel from each tissue sample; placing the trimmed tissue samples and an orientation indicator in an embedding mold; covering the trimmed tissue samples and the orientation indicator within the embedding mold with liquid paraffin; solidifying the liquid paraffin to create a paraffin block with the tissue samples and the orientation indicator embedded; trimming the paraffin block; mounting the trimmed paraffin block to a slide having a patient identifier; scanning, with a scanning system, the slide to create a digital image of each tissue sample; and saving, by the pathology information system, the digital images as image files based on information from the patient identifier.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The foregoing summary, as well as the following detailed description of the disclosure, will be better understood when read in conjunction with the appended figures. For the purpose of illustrating the disclosure, shown in the figures are embodiments which are presently preferred. It should be understood, however, that the disclosure is not limited to the precise arrangements, examples and instrumentalities shown.

FIG. 9 is a top view of the four tissue sample cassettes of FIG. 8 with the lids removed, according to aspects of the disclosure.

FIG. 10 is a perspective view of a digital imaging system, according to aspects of the disclosure.

FIG. 11 is a perspective view of a tissue processing system, according to aspects of the disclosure.

FIG. 12 is a top view of the four tissue sample cassettes of FIG. 9 on a hot plate embedding station after being processed in a tissue processing system, according to aspects of the disclosure.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the claims. Various aspects of the subject technology will now be disclosed according to particular but non-limiting examples. Various embodiments described in the present disclosure may be carried out in different ways and variations, and in accordance with a desired application or implementation.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

Figure 1:
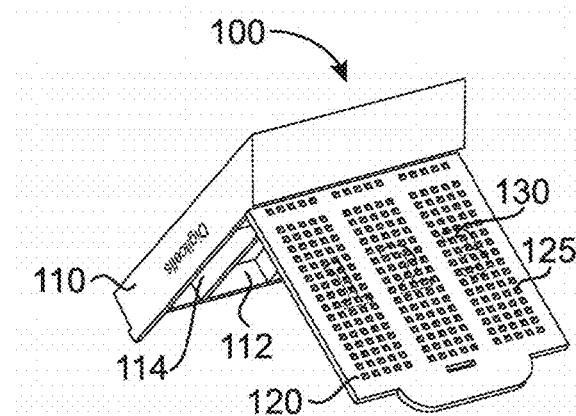
FIG. 1 is a perspective view of a tissue sample cassette, according to aspects of the disclosure.
Figure 2:
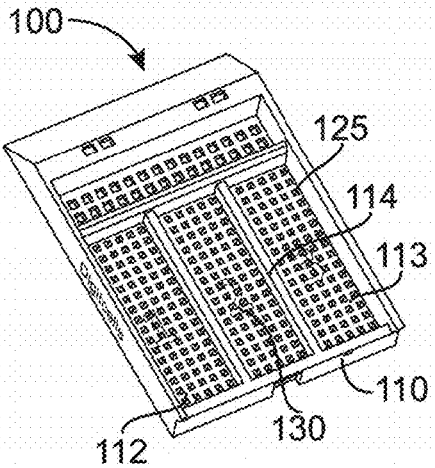
FIG. 2 is a perspective view of the tissue sample cassette of FIG. 1 without the lid, according to aspects of the disclosure.

As shown in FIGS. 1 and 2, a tissue sample cassette 100 is provided for storage, transport and processing of tissue samples 190 (see FIG. 3), such as prostate tissue from needle biopsy, for example. The tissue sample cassette 100 shown has a body 110 with three compartments 112 separated by dividers 114, each compartment 112 being configured to receive a single tissue sample 190. The tissue sample cassette 100 may have any suitable number of compartments (e.g., 4 compartments, 6 compartments) separated by a corresponding number of dividers 114. For example, three individual prostate cores 190 from the left side may each be placed in an individual compartment 112 of a first tissue sample cassette 100 and three individual prostate cores 190 from the right side may each be placed in an individual compartment 112 of a second tissue sample cassette 100. As another example, four individual upper GI tissue samples 190 may each be placed in an individual compartment 112 of a first tissue sample cassette 100 having four compartments 112 and four individual lower GI tissue samples 190 may each be placed in an individual compartment 112 of a second tissue sample cassette 100 having four compartments 112.

The tissue sample cassette 100 is configured to receive a sponge (not shown) in order to ensure separation of each compartment 112 and for fixing each tissue sample 190 in place in the individual compartment 112 when a lid 120 is closed. In aspects of the disclosure, the lid 120 may be rotatingly coupled (e.g., hinged) to the body 110 so that the body 110 and the lid 120 form a unitary tissue sample cassette 100 and the lid 120 may be opened as needed. In aspects of the disclosure, the lid 120 may be removably coupled (e.g., snapped, friction fit) to the body 110 so that the lid 120 may be removed from the body 110 as needed. The body 110 and/or the lid 120 may have openings 125 that provide for fluid (e.g., formalin, gas) to flow into and out of the tissue sample cassette 100.

Sample identifiers 130 (e.g., A, B, C or 1, 2, 3) may be disposed on the tissue sample cassette 100 to label the compartments 112. For example, the sample identifiers 130 may be disposed on the lid 120 and/or a bottom 113 of each compartment 112 and the sample identifiers 130 may be formed in any suitable manner (e.g., printed, embossed, engraved, molded, stick on label, etc.). A cassette identifier 140 (see FIG. 5) may also be disposed on the tissue sample cassette 100 in order to provide identification information regarding that particular tissue sample cassette 100. The cassette identifier 140 may be formed by any suitable manner (e.g., 2D barcode, QRC, text).

Figure 3:
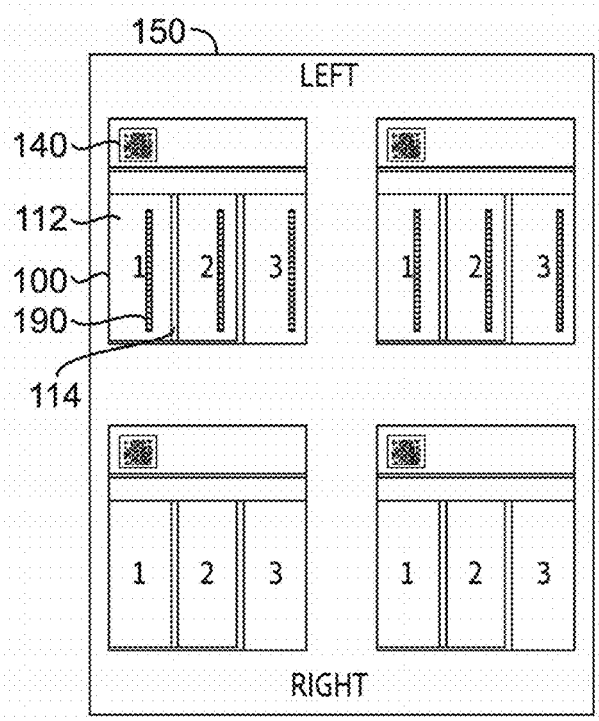
FIG. 3 is a top view of four tissue sample cassettes in a support holder, according to aspects of the disclosure.

As shown in FIG. 3, a cassette holder 150 may be configured to support and/or secure multiple tissue sample cassettes 100 in place, such as during the collection and fixing of tissue samples 190, for example. Here, the lids 120 are removed to provide easy access to the individual compartments 112. As shown, the cassette holder 150 is configured to support four tissue sample cassettes 100, with the top two tissue sample cassettes 100 for left core samples 190 and the bottom two tissue sample cassettes 100 for right core samples 190.

Figure 4:
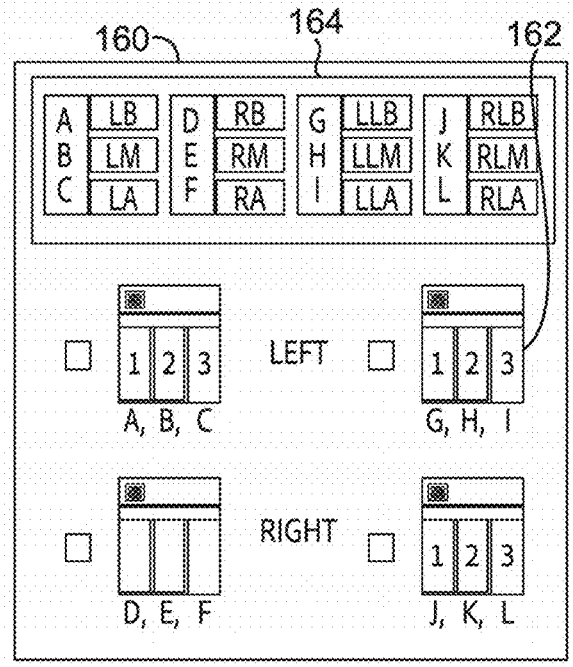
FIG. 4 is a schematic view of a computer screen image of the tissue sample cassettes in FIG. 3, according to aspects of the disclosure.

As shown in FIG. 4, a display 160 shows a digital representation 162 of each of the tissue sample cassettes 100 of FIG. 3. The display 160 also includes a table 164 defining the specific sample to be stored or stored in each tissue sample cassette 100/compartment 112 location.

Figure 5:
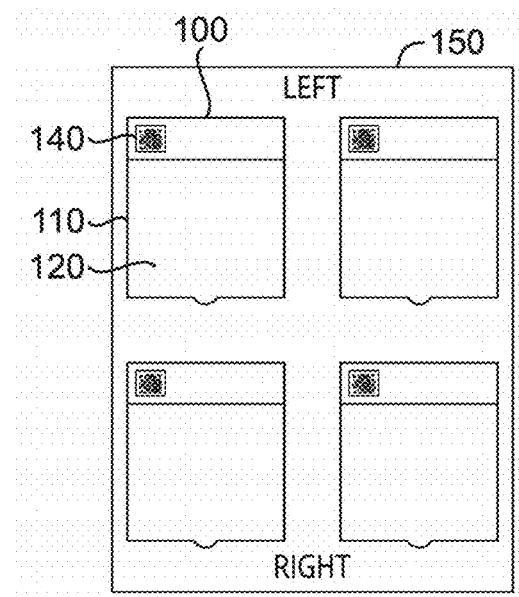
FIG. 5 is a top view of the four tissue sample cassettes in the support holder of FIG. 3 with closed lids, according to aspects of the disclosure.

As shown in FIG. 5, the cassette holder 150 supports the four tissues sample cassettes 100 that now each has a lid 120 in place. For example, each tissue sample cassette 100 may have tissue samples in the compartments 112, a sponge placed within and/or over the compartments 112 and the lid 120, such as in preparation for storage and/or shipping.

Figure 6:
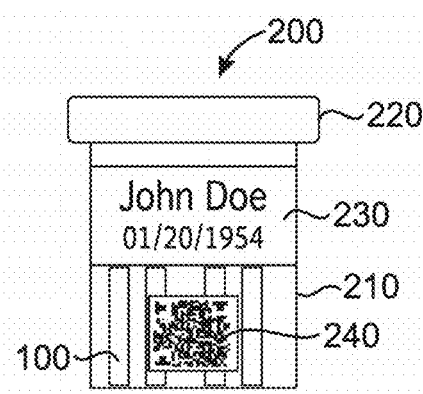
FIG. 6 is a front view of the tissue sample cassettes of FIG. 5 in a formalin container, according to aspects of the disclosure.

As shown in FIG. 6, a storage container 200 is configured to store multiple tissue sample cassettes 100, such as the four tissue sample cassettes 100 of FIG. 5 removed from the cassette holder 150. Here, the storage container 200 is a jar 210 with a lid 220 that provides for a sealed storage container 200 when the lid 220 is in place on the jar 210. The storage container 200 may be any suitable container that can be sealed (e.g., vial, box). The storage container 200 includes a patient identifier 230, which may be a printed label with patient information (e.g., name, birthdate). The storage container 200 also includes a container label 240 that may be formed by any suitable manner (e.g., 2D barcode, QRC, text). The storage container 200 may be configured to sealingly contain a storage medium (e.g., formalin) such that the tissue sample cassettes 100 are submerged in the s during storage and transport.

Figure 7:
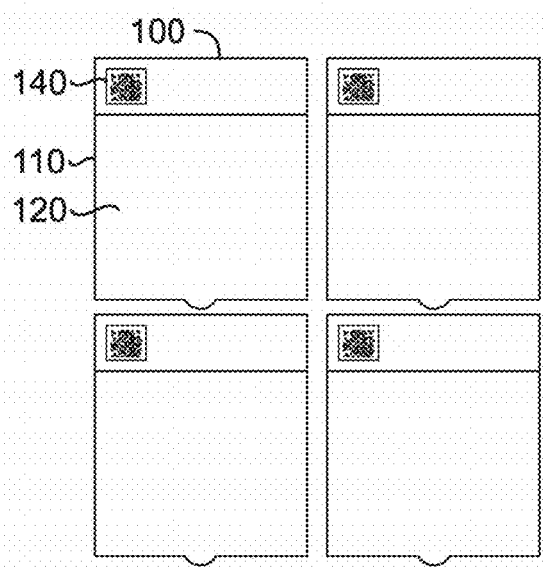
FIG. 7 is a top view of the four tissue sample cassettes removed from the support holder of FIG. 3 with lids removed, according to aspects of the disclosure.
Figure 8:
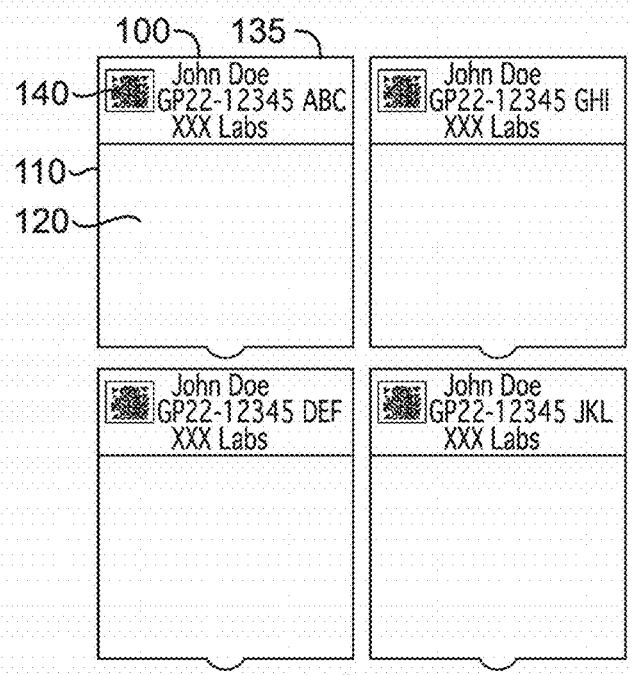
FIG. 8 is a top view of the four tissue sample cassettes of FIG. 7 after being labeled, according to aspects of the disclosure.

As shown in FIGS. 7 and 8, the tissue sample cassettes 100 have been removed from the storage container 200, such as being received after shipping. Here, any residual fluid from the storage container 200 may have been removed (e.g., wipe out formalin). The tissue sample cassettes 100 may also include a patient label 135. For example, the patient label 135 may be formed by a cassette printer based on a scan of the sample identifier 130. The patient label 135 may provide any desired information, such as patient name, compartment contents and the laboratory the samples came from, for example.

As shown in FIG. 9, the tissue sample cassettes 100 with patient labels 135 of FIG. 8 have the lids 120 opened or removed and the sponge removed. This provides for gross examination (e.g., visual inspection) of the tissue samples disposed within each compartment 112 of each tissue sample cassette 100 to ensure the tissue samples are intact. The end tips of the tissue samples 190 may be stained or colored to provide orientation indicators. For example, the top tips 191 of the tissue samples 190 may be stained red and the bottom tips 193 of the tissue samples 190 may be stained green.

As shown in FIG. 10, a digital imaging system 300 may be used to take digital images of the tissue sample cassettes 100 and the tissue samples disposed within the compartments 112. The digital images may be used in further processing, such as by an artificial intelligence (AI) system, for example. Here, an AI system may analyze the digital images to measure the length and width of each tissue sample and record these measurements in a gross description field.

Turning to FIG. 11, a tissue processing system 400 may be used to process tissue samples within tissue sample cassettes 100. For example, the tissue processing system 400 may dehydrate gel that has been added to the tissue sample cassettes 100 in order to provide a dried sample block of tissue samples.

As shown in FIG. 12, the tissue sample cassettes 100 with patient labels 135 of FIG. 9 are placed on an embedding station 450 (e.g., hot plate). As shown, each tissue sample is marked with an indicator 192, such as colored ink dots (e.g., red, green, black) placed on a fixing medium 118 (e.g., gel) that covers the tissue sample 190. Indicators 192 provide for identification of each tissue sample 190 within a tissue sample cassette 100 in order to prevent mix-ups among the tissue samples 190.

Figure 13:
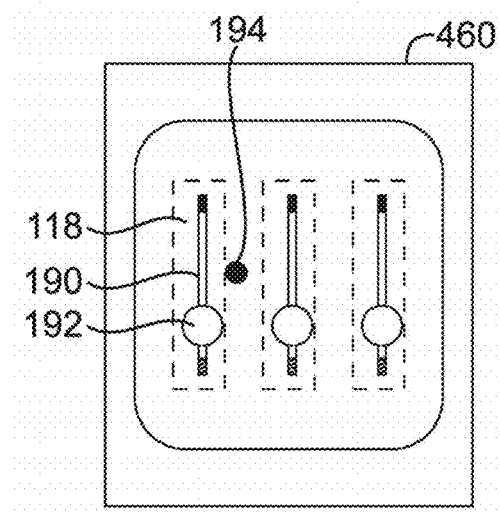
FIG. 13 is a top view of three core samples in an embedding mold, according to aspects of the disclosure.

Turning to FIG. 13, an embedding mold 460 is configured to receive tissue samples 190 that have been trimmed from the fixing medium 118 (e.g., a block of gel) of the tissue sample cassette 100. Each tissue sample 190 is still affixed to a portion of the fixing medium 118 that has an indicator 192. Thus, the tissue samples 190 are disposed in the embedding mold 460 in the same orientation and order that the tissue samples 190 were disposed in the tissue sample cassette 100. An orientation indicator 194 may also be disposed in the embedding mold 460.

Figure 14:
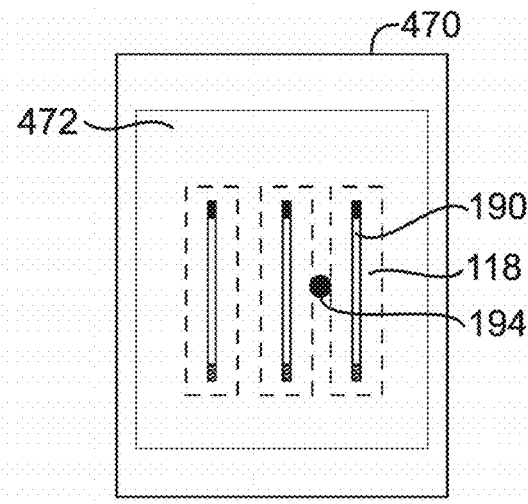
FIG. 14 is a bottom view of three core samples in the embedding mold of FIG. 13, according to aspects of the disclosure.

As shown in FIG. 14, a block 470 is formed from an embedding medium 472 (e.g., paraffin) that was added to the embedding mold 460. Once the embedding medium 472 is hardened, the block 470 may be removed from the embedding mold 460 and the orientation indicator 194 is visible on or through the bottom surface of the block 470.

Figure 15:
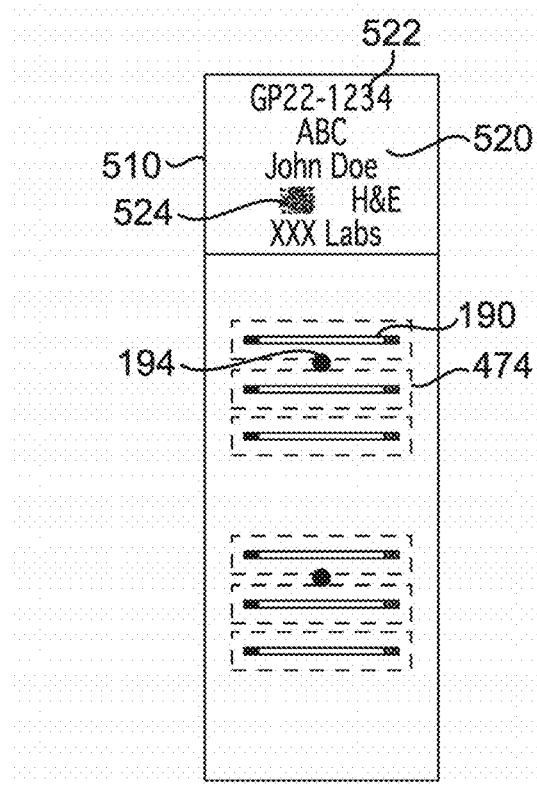
FIG. 15 is a top view of six core samples on a glass slide, according to aspects of the disclosure.
Figure 16:
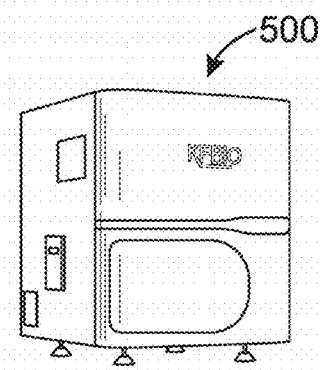
FIG. 16 is a perspective view of a scanner workstation, according to aspects of the disclosure.

Turning to FIGS. 15 and 16, the tissue samples 190 from one or more trimmed blocks 474 are mounted on a slide 510 (e.g., glass slide). As shown, the orientation indicator 194 is still disposed on the trimmed block 474. A patient identifier 520 (e.g., label, printed ink) may be disposed on each slide 510. The patient identifier 520 shown is a combination of text 522 and a bar/QRC code 524. The slides 510 may be scanned by a scanning system 500 (e.g., scanner workstation), which may be part of a digital network.

Figure 17:
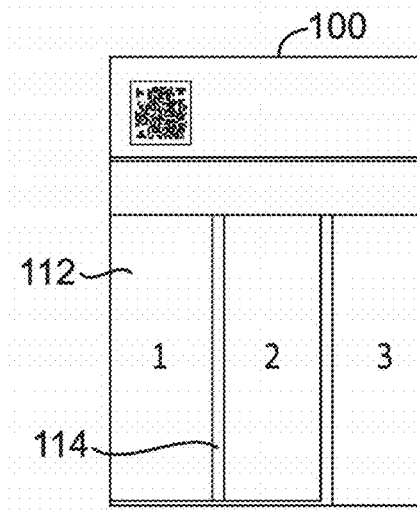
FIG. 17 is a top view of a three compartment tissue sample cassette, according to aspects of the disclosure.
Figure 18:
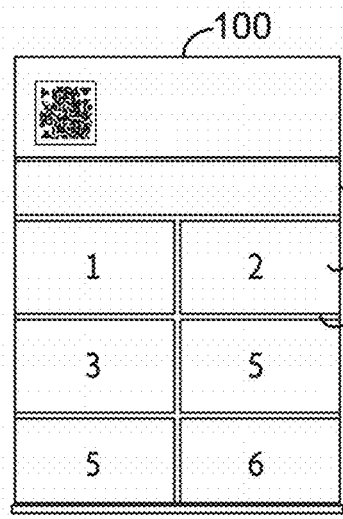
FIG. 18 is a top view of a six compartment tissue sample cassette, according to aspects of the disclosure.

As shown in FIG. 17, a tissue sample cassette 100 may be configured with three compartments 112 and two dividers 114, thus providing space for three tissue samples to be disposed one per compartment 112. Similarly, as shown in FIG. 18, a tissue sample cassette 100 may be configured with six compartments 112 and three dividers 114, thus providing space for six tissue samples to be disposed one per compartment 112. A tissue sample cassette 100 may be configured with any suitable number of compartments 112 based on the number and placement of dividers 114. The tissue sample cassette 100 may be formed as a unitary body 110 (e.g., molded) where the dividers 114 are formed integrally with the body 110. In aspects of the disclosure, separate dividers 114 may be coupled (e.g., snap fit, fixed with adhesive) to a body 110 having a single compartment 112 to create a desired number of compartments 112.

Figure 19:
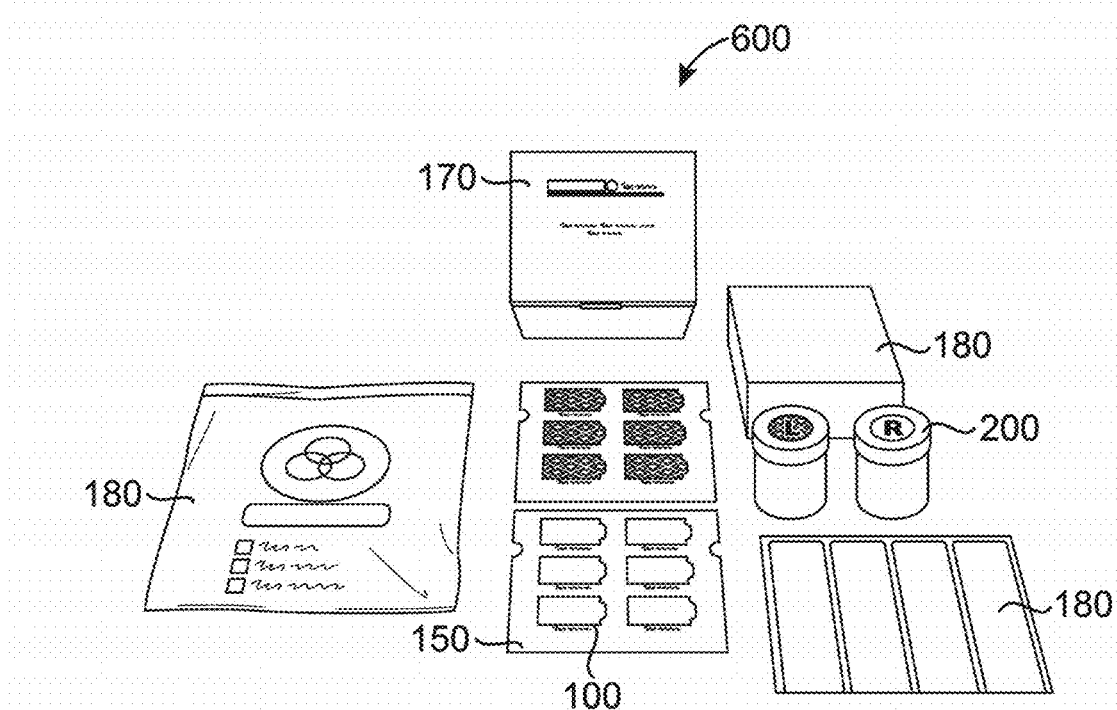
FIG. 19 is a perspective view of a histology cassette collection and transport kit, according to aspects of the disclosure.

Turning to FIG. 19, a kit 600 (e.g., histology cassette collection and transport kit) is shown. Here, the kit 600 includes two cassette holders 150, each with multiple tissue sample cassettes 100, two storage containers 200, a shipping container 170 and various packing materials 180. A kit 600 may include any suitable combination of the above components, additional components and fewer components than shown here.

Figure 20:
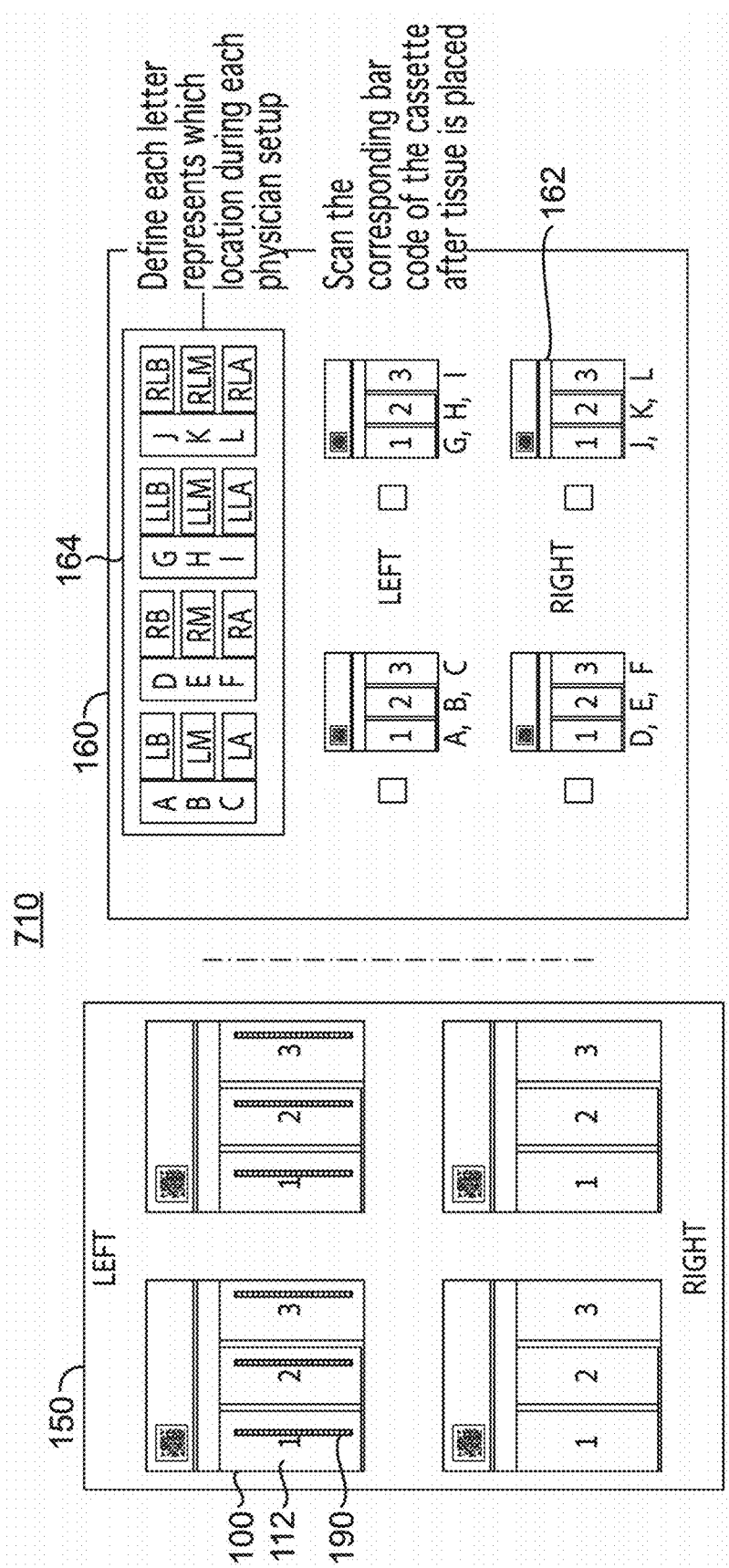
FIG. 20 is a schematic diagram of a tissue sample collection module, according to aspects of the disclosure.

As shown in FIG. 20, a tissue sample system 700 may include a, 710. The sample collection module 710 may include a cassette holder 150 containing four tissue sample cassettes 100. Here, tissue samples 190 (e.g., biopsy cores) from a patient are disposed in corresponding compartments 112 of the tissue sample cassettes 100. The sample collection module 710 may also include a computerized scan of the tissue sample cassettes 100, which translates into a display 160 of the contents of the cassette holder 150, the display 160 including a digital representation 162 of each of the tissue sample cassettes 100 and a corresponding table 164.

Figure 21:
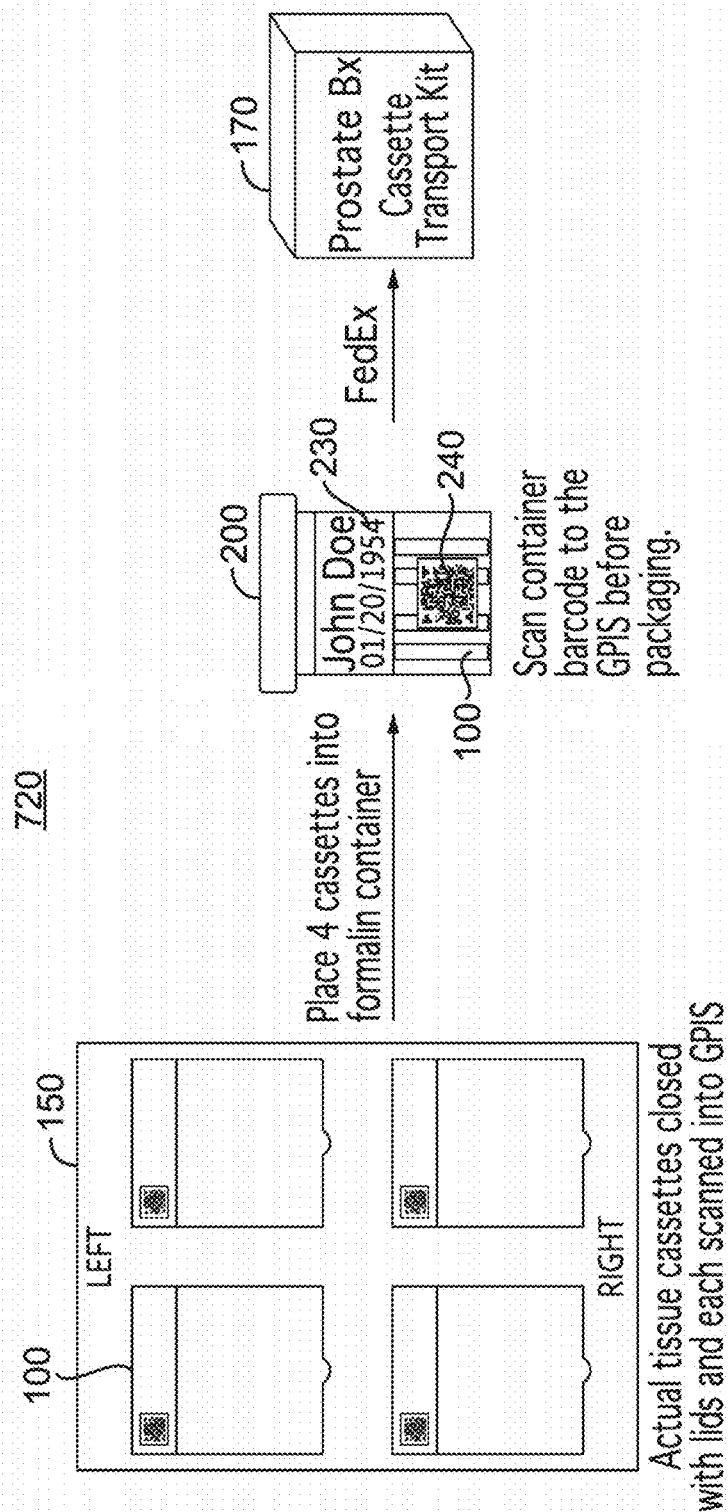
FIG. 21 is a schematic diagram of a tissue sample shipping module, according to aspects of the disclosure.
Figure 22:
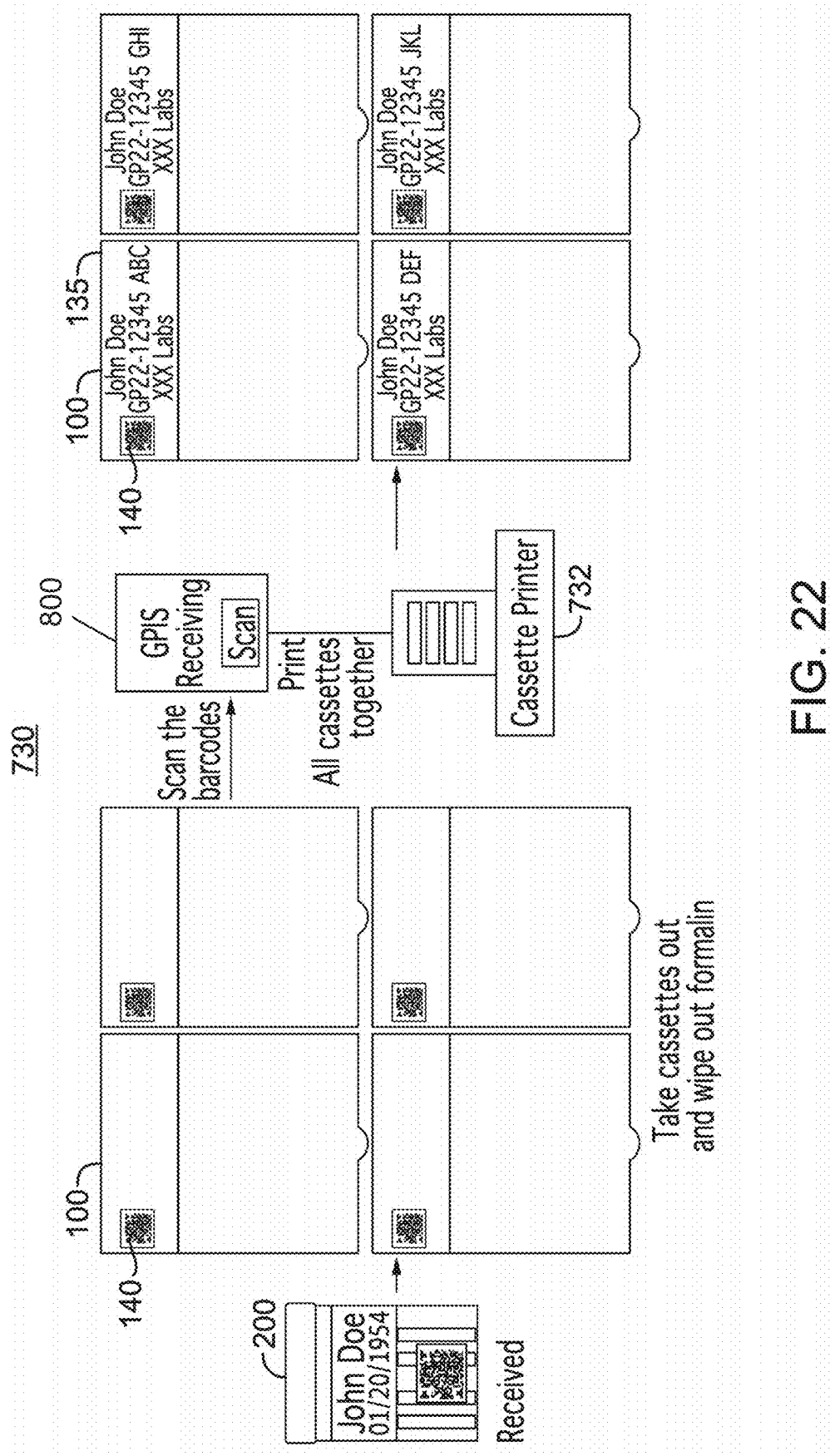
FIG. 22 is a schematic diagram of a tissue sample receiving module, according to aspects of the disclosure.

Turning to FIG. 21, a sample shipping module 720 of the tissue sample system 700 may include a cassette holder 150 with closed tissue sample cassettes 100 that have been digitally scanned into a pathology information system 800 (see FIG. 22). The sample shipping module 720 may also include a storage container 200 having a patient identifier 230 and a container label 240 that may be scanned into the pathology information system 800. The storage container 200 may include the tissue sample cassettes 100 from the cassette holder 150 and a storage medium (e.g., formalin). The sample shipping module 720 may also include a shipping container 170 in which the storage container 200 may be securely packaged and shipped to a processing facility (e.g., pathology lab).

As shown in FIG. 22, the tissue sample system 700 may include a sample receiving module 730. The sample receiving module 730 may include the storage container 200 removed from the shipping container 170 and the individual tissue sample cassettes 100 removed from the storage container 200 with the storage medium removed (e.g., formalin wipe off). The sample receiving module 730 may also include scans of the cassette identifier 140 from each of the tissue sample cassettes 100 into the same or a different pathology information system 800 (e.g., receiving station). The sample receiving module 730 may also include a cassette printer 732 for printing a patient label 135 on each tissue sample cassette 100.

Figure 23:
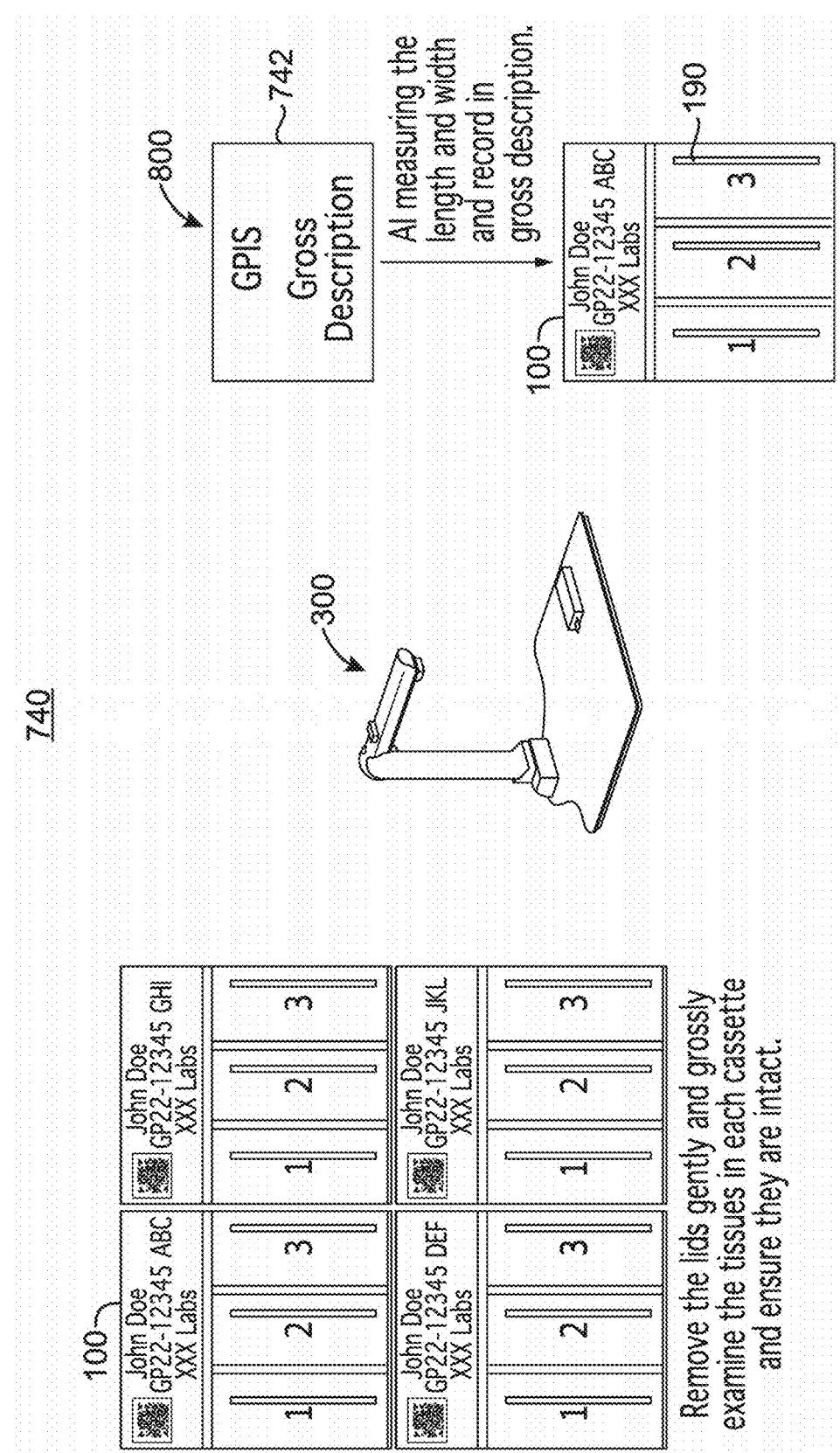
FIG. 23 is a schematic diagram of a tissue grossing module, according to aspects of the disclosure.

Turning to FIG. 23, a tissue grossing module 740 of the tissue sample system 700 may include digital images of the tissue sample cassettes 100 with lids removed taken by a digital imaging system 300. The tissue grossing module 740 may also include uploads of the digital images into a gross module 742 of the pathology information system 800. The gross module 742 may include an artificial intelligence (AI) program that measures the length and width of each tissue sample 190 and records those measurements in a gross description file.

Figure 24:
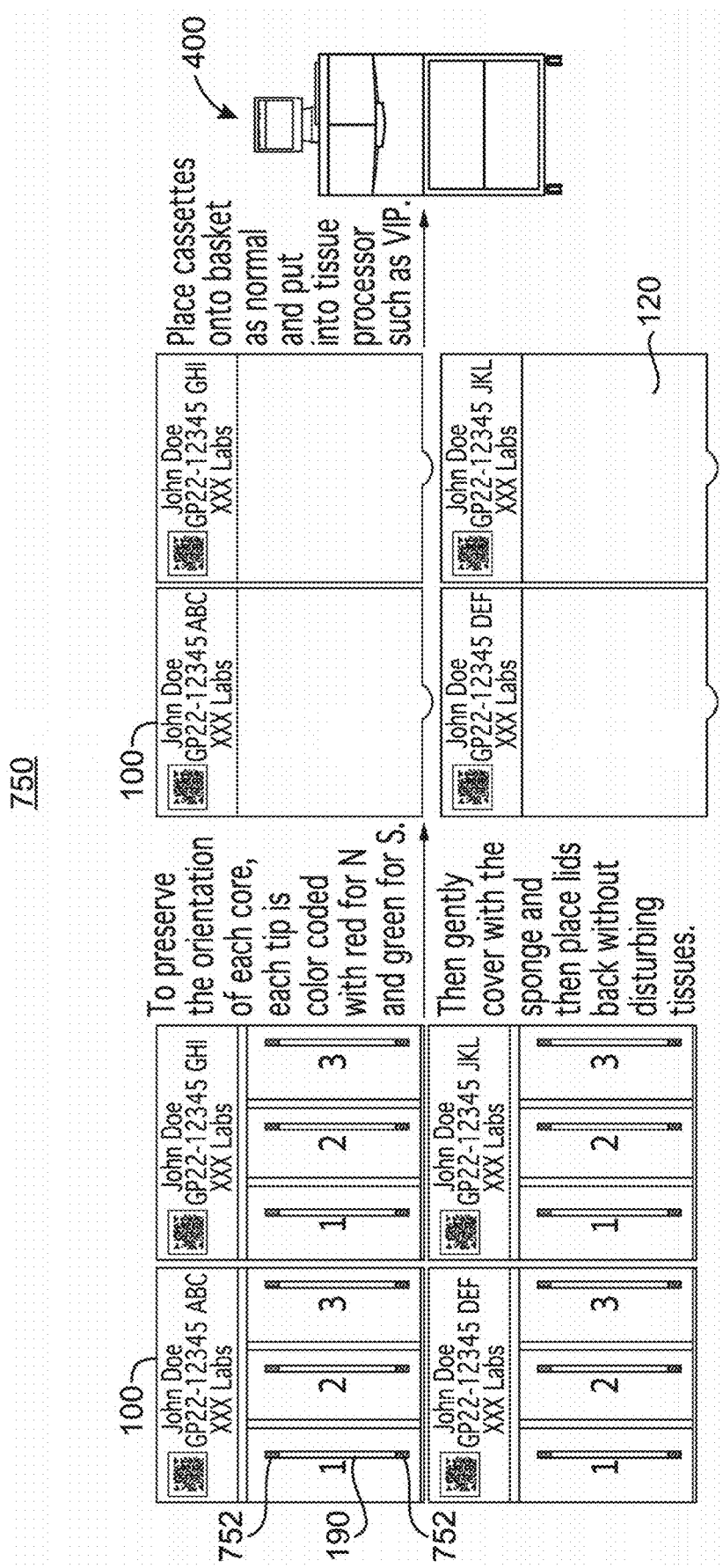
FIG. 24 is a schematic diagram of a tissue processing module without gel protection, according to aspects of the disclosure.

As shown in FIG. 24, the tissue sample system 700 may include a tissue processing module 750 without gel protection. The tissue processing module 750 may include the tissue sample cassettes 100 containing tissue samples 190 that have been stained at each end to provide orientation markers 752 for the tissue samples 190. For example, the top tips 191 of the tissue samples 190 may be stained red and the bottom tips 193 of the tissue samples 190 may be stained green (e.g., by cotton swab). The tissue processing module 750 may also include the tissue sample cassettes 100 containing the stained tissue samples 190 and a sponge (not shown) disposed on top of the compartments 112 with the lid 120 closed on top of the sponge. The tissue processing system 400 may provide dehydration of the contents of the tissue sample cassettes 100.

Figure 25:
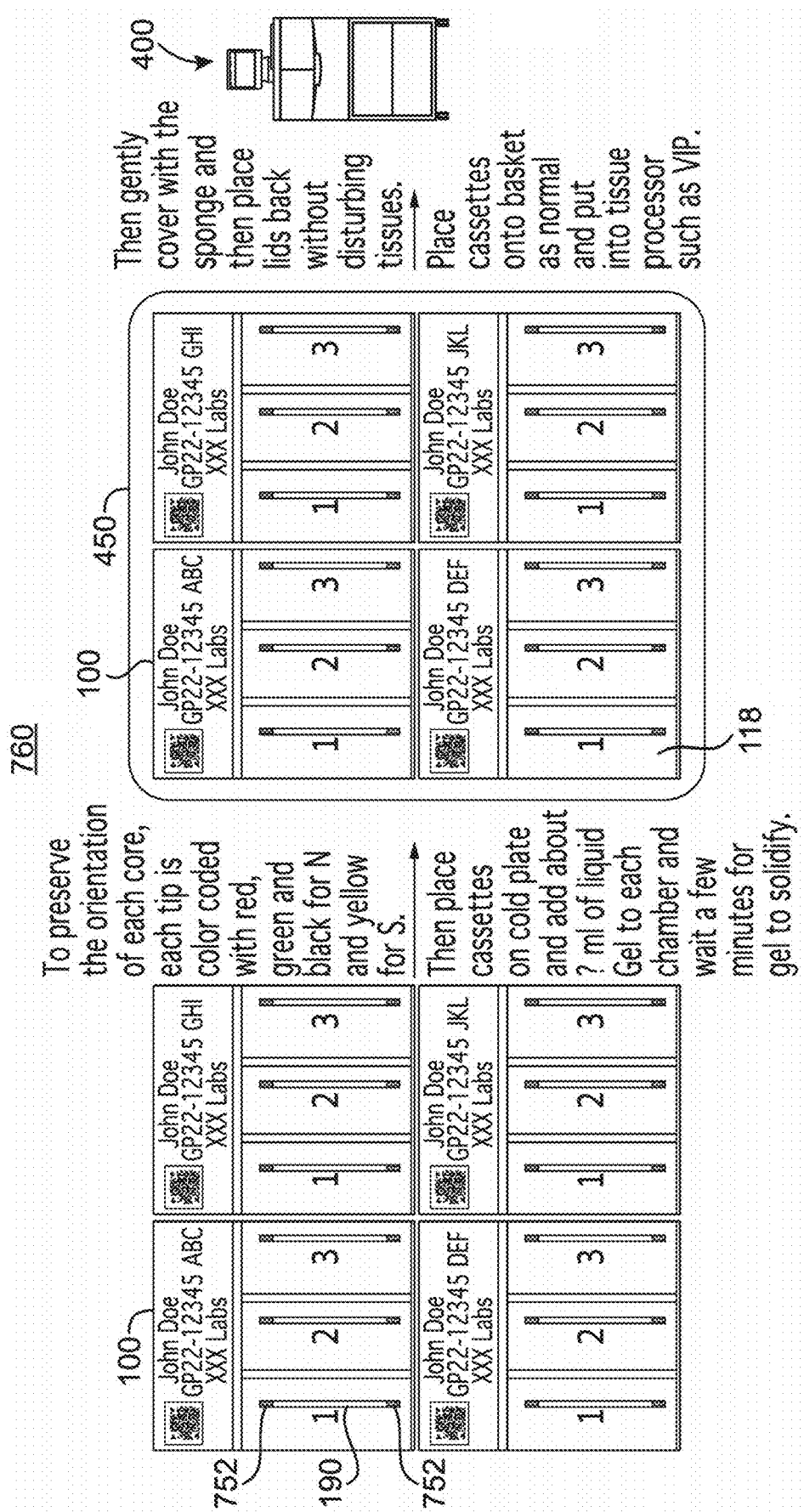
FIG. 25 is a schematic diagram of a tissue processing module with gel protection, according to aspects of the disclosure.

As shown in FIG. 25, the tissue sample system 700 may include a tissue processing module 760 with gel protection. The tissue processing module 760 may include the tissue sample cassettes 100 containing tissue samples 190 that have been stained at each end to provide orientation markers 752 for the tissue samples 190. For example, the top tips 191 of the tissue samples 190 may be stained red, green and black, respectively and the bottom tips 193 of the tissue samples 190 may be stained yellow (e.g., by cotton swab). The tissue processing module 760 may also include the tissue sample cassettes 100 disposed on an embedding station 450 (e.g., cold plate), where each compartment 112 contains a fixing medium 118 such as a liquid gel that covers the tissue sample 190 and solidifies. The tissue processing module 760 may also include the tissue sample cassettes 100 containing the solidified gel 118 disposed in a tissue processing system 400. Here, the tissue sample cassettes 100 may have a sponge (not shown) disposed on top of the compartments 112 and the lid 120 is closed on top of the sponge. The tissue processing system 400 may provide dehydration of the contents of the tissue sample cassettes 100.

Figure 26:
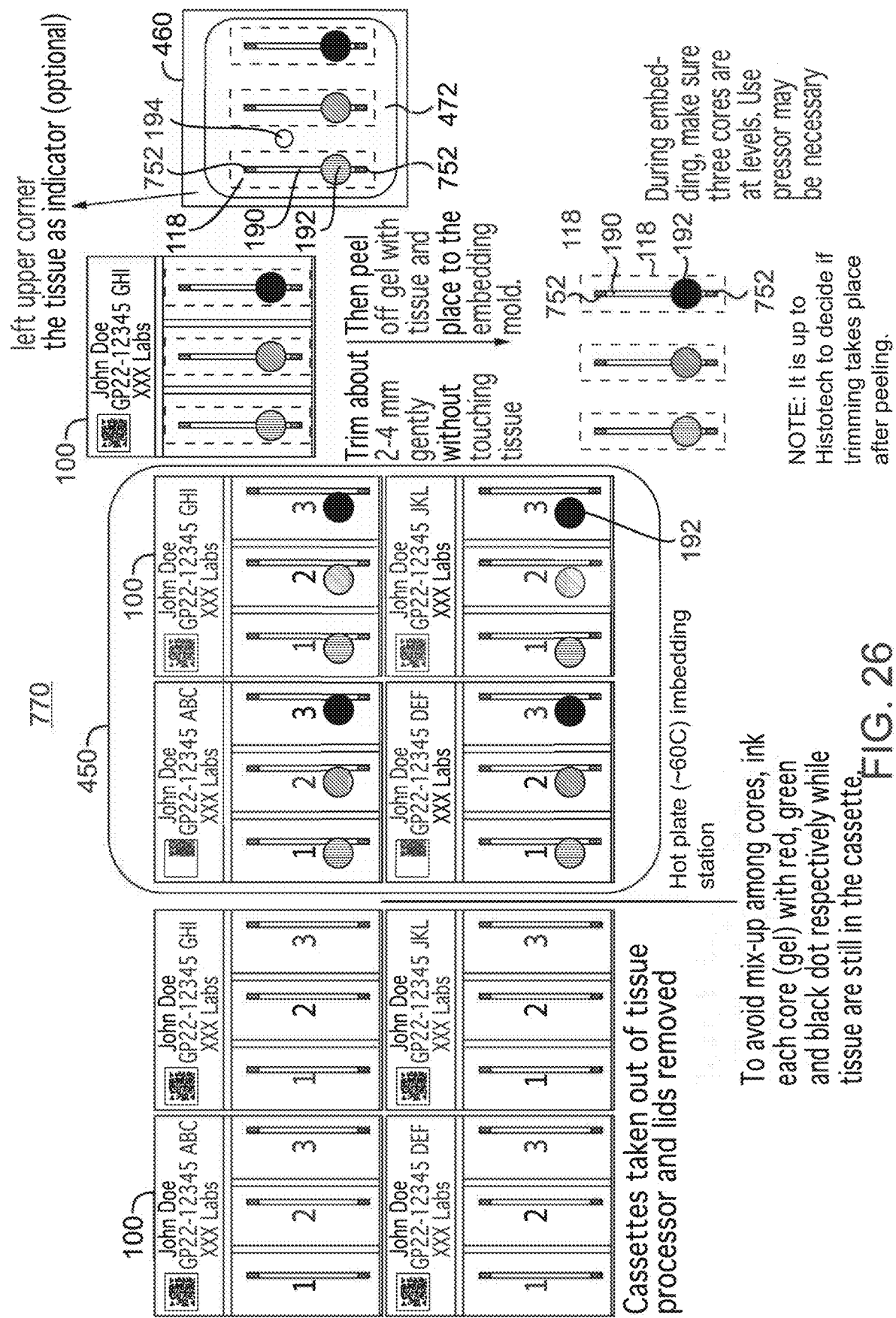
FIG. 26 is a schematic diagram of a tissue embedding module, according to aspects of the disclosure.

Turning to FIG. 26, a tissue embedding module 770 of the tissue sample system 700 may include the tissue sample cassettes 100 removed from the tissue processing system 400 and with lids 120 removed, the tissue sample cassettes 100 being disposed on an embedding station 450 (e.g., hot plate). The tissue embedding module 770 may also include an embedding mold 460 in which trimmed tissue samples 190 each having an indicator 192 are disposed along with an orientation indicator 194. The embedding mold 460 may also include an embedding medium 472 that covers the tissue samples 190 and the orientation indicator 194. For example, the embedding medium 472 may be liquid paraffin that is poured into the embedding mold 460 and then hardened or solidified.

Figure 27:
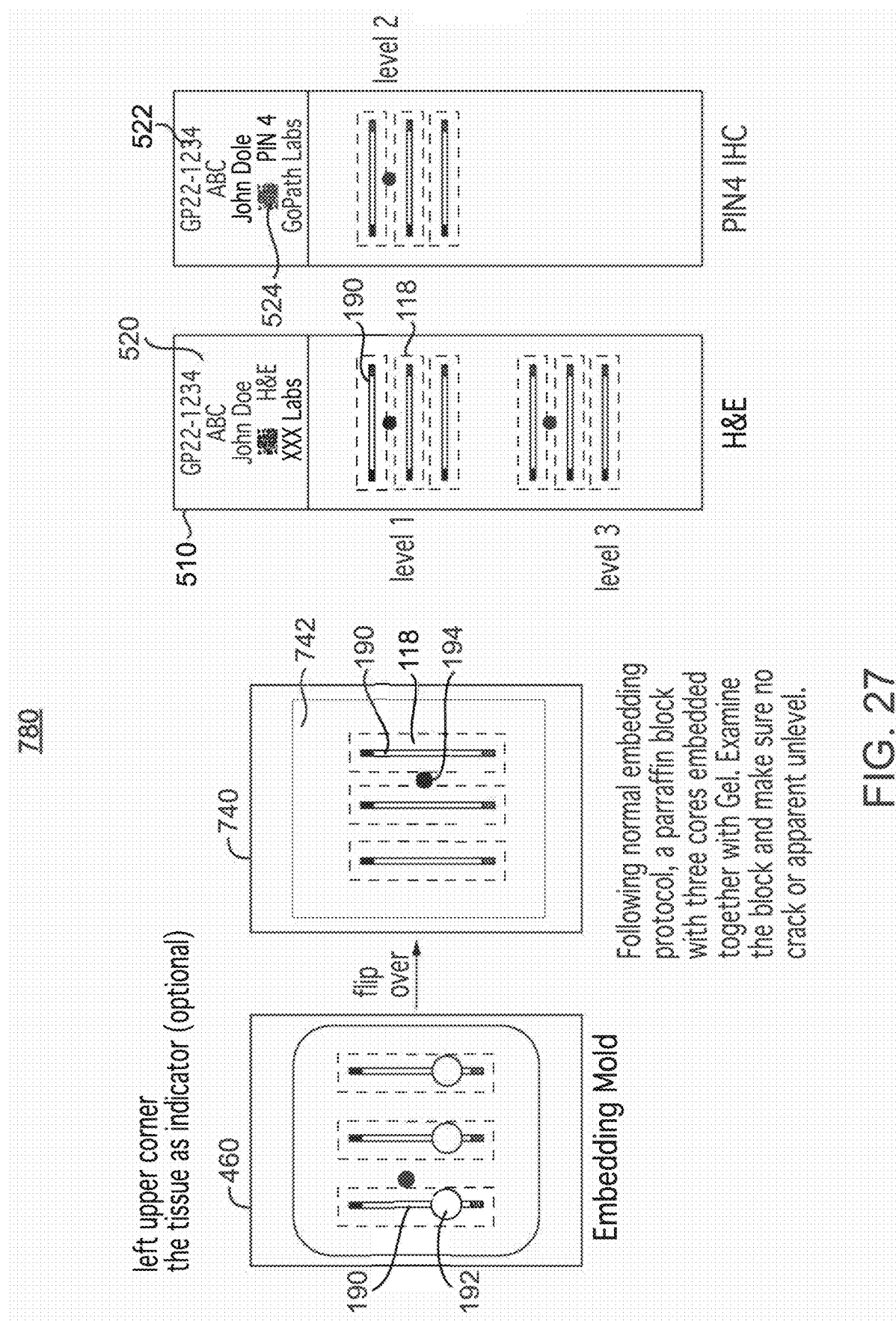
FIG. 27 is a schematic diagram of a tissue cutting module, according to aspects of the disclosure.

As shown in FIG. 27, the tissue sample system 700 may include a tissue cutting module 780. The tissue cutting module 780 may include a block 470 formed of the hardened embedding medium 472, which may be removed from the embedding mold 460. The tissue cutting module 780 may also include trimmed or cut portions of the block 470 containing the tissue samples 190 disposed on a slide 510 that has a patient identifier 520.

Figure 28:
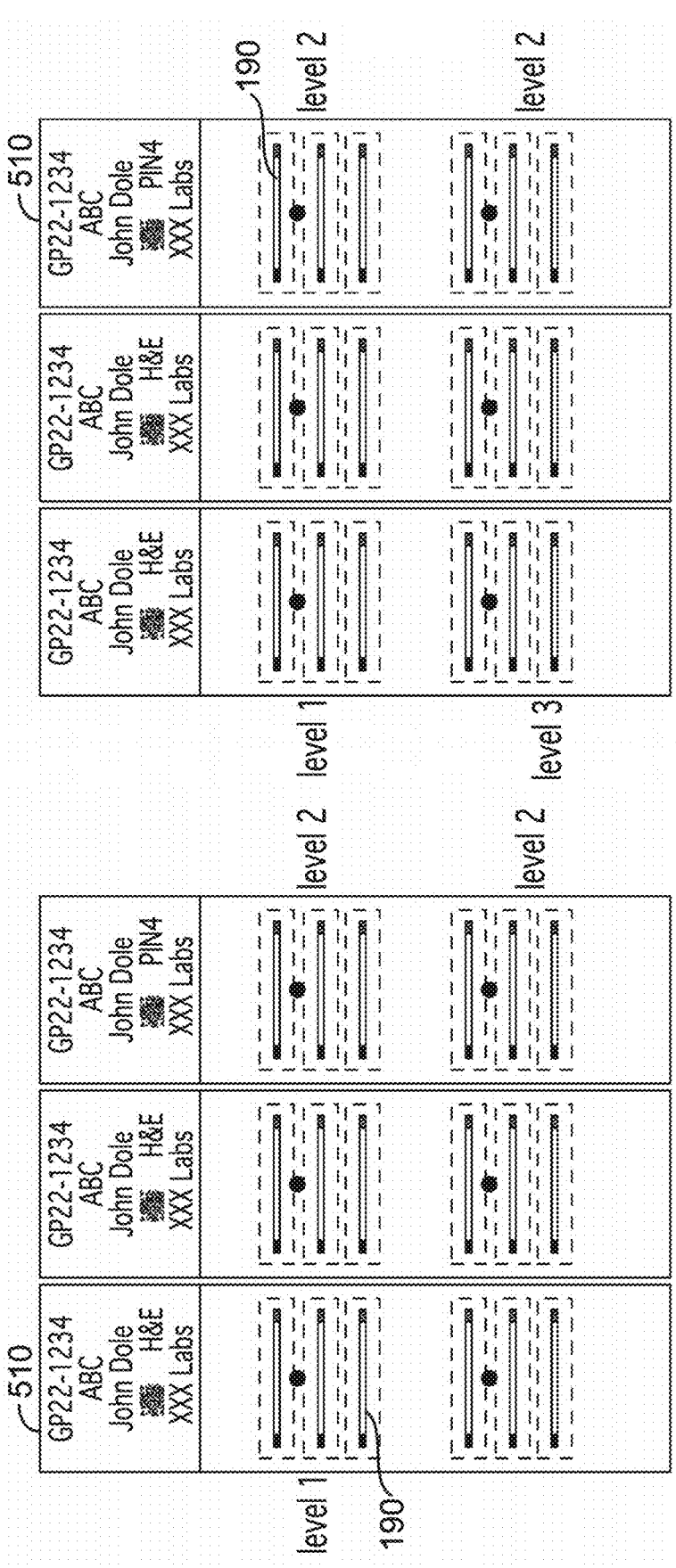
FIG. 28 is a schematic diagram of a tissue embedding module, according to aspects of the disclosure.

Turning to FIG. 28, an example of a set of slides 510 bearing prostate tissue core samples 190 for prostate pathology examination is shown. As shown, there are two full slides 510 with a total of twelve hematoxylin and eosin (H&E) stained tissue samples 190 for each of the left prostate and right prostate. In addition, there is one full slide 510 of Peptidyl-prolyl cis-trans isomerase NIMA-interacting 4 (PIN4) stained tissue samples 190 for each of the left prostate and right prostate. The set 550 of slides 510 may be provided for microscope viewing and/or digital scanning.

Figure 29:
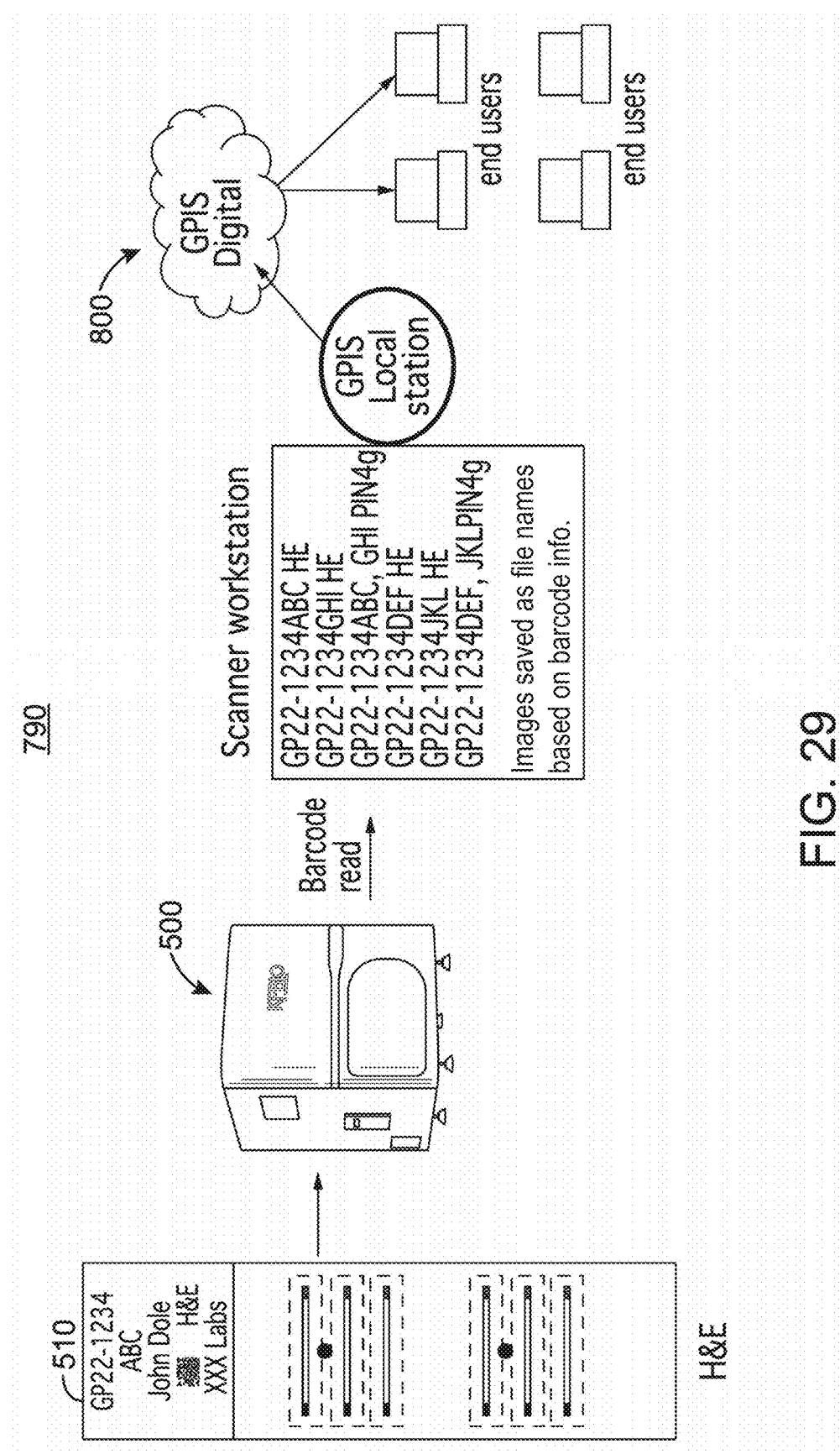
FIG. 29 is a schematic diagram of a digital scanning and management module, according to aspects of the disclosure.

As shown in FIG. 29, the tissue sample system 700 may include a digital scanning and management module 790. The digital scanning and management module 790 may include a scanning system 500 for scanning the slides 510 and saving scanned images as file names based on information from the patient identifier 520 (e.g., bar/QRC code 524). The image files may then be accessed by authorized users of the pathology information system 800.

In use, the tissue sample system 700 may be used for obtaining and providing optimal tissue samples for pathology analysis in an efficient and secure process.

To begin, using the sample collection module 710, a doctor or other health care provider may obtain tissue samples 190 from a patient in a medical care facility (e.g., doctor's office, lab, hospital) with any suitable medical instrument (e.g., biopsy needle, laparoscopic instrument). For example, a needle biopsy may be performed at multiple locations of the patient's prostrate to obtain prostate tissue cores 190. Here, after each tissue core 190 is obtained by the needle, the health care provider may transfer the tissue core 190 directly from the needle into a compartment 112 of a tissue sample cassette 100, either while the tissue sample cassette 100 is held in the cassette holder 150 or when the tissue sample cassette 100 having been removed from the cassette holder 150. The process may be repeated until the desired number of tissue cores 190 are taken and disposed within one or more tissue sample cassettes 100, with one tissue core 190 per compartment 112. This process allows for the tissue cores 190 to be fixed in place from the start, unlike the typical sample process in which the tissue samples are placed into a jar from the needle and are not fixed in place at this stage.

Continuing with the sample collection module 710, the health care provider or other technician may scan an individual tissue sample cassette 100 with an open lid 120 using an imaging system (e.g., digital imaging system 300), then closing the lid 120 and repeating the process with additional tissue sample cassettes 100 until all of the tissue cores 190 are scanned. In aspects of the disclosure, the cassette identifier 140 of a tissue sample cassette 100 may be scanned after the tissue core(s) 190 are placed in the tissue sample cassette 100.

The sample collection module 710 further provides for creating or generating a display 160 (e.g., computer screen display) showing a digital representation 162 of each tissue sample cassette 100, each digital representation 162 having identifiers (e.g., letters) for each tissue core 190/compartment 112 location. The display 160 may also include a table 164 defining the specific sample to be stored or stored in each tissue sample cassette 100/compartment 112 location. For example, as shown in FIG. 20, the table 164 may define each letter A through L to represent a tissue sample cassette 100/compartment 112 location for each tissue core 190, such as during physician set up. Thus, letters A to C match compartments 1 to 3 of the first tissue sample cassette 100 and so on. In aspects of the disclosure, the tissue sample cassettes 100 and/or the digital representation 162 may be color coded or differentiated in any other suitable manner. As shown in FIG. 20, for example, each of the four tissue sample cassettes 100 has a different physical color (e.g., blue, green, purple, grey) that is represented with the corresponding color on the display 160.

Continuing with the sample shipping module 720, the tissue sample cassettes 100 may be removed from the cassette holder 150 or may already have been removed from the cassette holder 150 during the sample collection module 710, and then placed into the storage container 200. For example, as shown in FIG. 21, all four tissue sample cassettes 100 containing the twelve tissue cores 190 obtained in the sample collection module 710 are placed into the jar 210 that is filled with a storage medium (e.g., formalin) for preservation of the tissue cores 190, after which the lid 220 is put on to seal the storage container 200 for shipping. Here, a patient identifier 230 in the form of a label with printed text may be created and applied to the jar 210, or the jar 210 may already have the patient identifier 230 affixed before using the sample shipping module 720. Similarly, a container label 240 may be printed and applied to the jar 210 or the container label 240 may already be affixed to the jar 210. In another aspect of the sample shipping module 720, the storage container 200 is securely packed into a shipping container 170 and shipped to a processing facility (e.g., pathology lab). Here, the storage container 200 and tissued sample cassettes 100 combine to provide a fixation process that keeps tissue sample 190 integrity and orientation.

The next step of the tissue sample system 700 is using the sample receiving module 730 to remove the storage container 200 from the shipping container 170 at the processing center. Continuing with the sample receiving module 730, the tissue sample cassettes 100 are removed from the storage container 200 and any residual formalin is wiped off and/or out of each tissue sample cassette 100. As shown in FIG. 22, the cassette identifier 140 of each of the four tissue sample cassettes 100 may be scanned by and/or into a pathology information system 800 (e.g., a scanner of a receiving station) and patient labels 135 may be printed directly on to each tissue sample cassette 100 by a cassette printer 732 interfaced to the pathology information system 800. In aspects of the disclosure, the patient labels 135 may be printed as separate labels that are then affixed to the tissue sample cassettes 100.

Continuing on with using the tissue grossing module 740, a technician may gently remove or open the lids 120 from the body 110 of the tissue sample cassettes 100 and grossly examine (e.g., visually) the tissue samples 190 in each tissue sample cassette 100 to ensure that they are intact. Each tissue sample cassette 100 with the lid 120 removed/open may be placed on or in a digital imaging system 300 and a digital image taken. Continuing with the tissue grossing module 740, the digital images may be uploaded to a gross description module 742 of the pathology information system 800, wherein a program (e.g., AI program) of the pathology information system 800 may measure the length and width of each tissue sample 190 and record those measurements in a gross description file. This process is more efficient and accurate that the typical process of measuring the length and width of each tissue sample 190 by hand with a ruler. Thus, the tissue grossing module 740 saves time over the typical process and improves integrity of the tissue samples 190 since the tissue samples 190 do not need to be directly touched or handled.

Another step of the tissue sample system 700 is using either the tissue processing module 750 or the tissue processing module 760 to process the tissue samples 190 (e.g., after completion of the tissue grossing module 740).

Using the tissue processing module 750, the end tips of each tissue sample 190 may be color coded to indicate or preserve the orientation of each tissue sample 190. As shown in FIG. 24, each tissue sample 190 may be colored (e.g., stained) with p while remaining in place in the compartment 112 of the tissue sample cassette 100, where the top ends 191 of each tissue sample 190 may be colored red for north and the bottom ends 193 may be colored green for south, for example.

Continuing with the tissue processing module 750, a sponge may be placed on the compartments 112 and the lid 120 placed back in the closed position, thus fixing the tissue samples 190 in place. For example, a single sponge may cover all of the compartments 112 of a tissue sample cassette 100 or separate sponges may be used to cover each compartment 112 individually. The closed tissue sample cassettes 100 may be placed in a tissue processing system 400 for processing (e.g., dehydration) of the tissue samples 190. For example, the tissue sample cassettes 100 may be placed in a basket that is then placed in the tissue processing system 400. Thus, tissue processing module 750 is used without a fixing medium like a gel.

Using the tissue processing module 760, the end tips of each tissue sample 190 may be color coded to indicate or preserve the orientation of each tissue sample 190. As shown in FIG. 25, each tissue sample 190 may be colored (e.g., stained by cotton swab) with orientation markers 752 while remaining in place in the compartment 112 of the tissue sample cassette 100. Here, the top ends 191 of each set of three tissue samples 190 may be colored red, green and black, respectively for north and the bottom ends 193 may be colored yellow for south, for example.

Continuing with the tissue processing module 760, the tissue sample cassettes 100 may be placed on an embedding station 450, such as a cold plate as shown in FIG. 25, with the lids 120 removed or open. A fixing medium 118, such as a liquid gel, may be added (e.g., poured in) to each compartment 112 in order to cover the tissue sample 190 stored within. After waiting for a time period (e.g., a few minutes), the fixing medium 118 hardens or solidifies.

Continuing with the tissue processing module 760, a sponge may be placed on the compartments 112 and the lid 120 placed back in the closed position, thus fixing the tissue samples 190 in place. For example, a single sponge may cover all of the compartments 112 of a tissue sample cassette 100 or separate sponges may be used to cover each compartment 112 individually. The closed tissue sample cassettes 100 may be placed in a tissue processing system 400 for processing (e.g., dehydration) of the tissue samples 190. For example, the tissue sample cassettes 100 may be placed in a basket that is then placed in the tissue processing system 400. Thus, tissue processing module 760 is used with a fixing medium 118 like a gel.

Continuing with the tissue sample system 700, a tissue embedding module 770 may be used following either tissue processing module 750 or tissue processing module 760. Here, the tissue sample cassettes 100 have been removed from the tissue processing system 400 and placed an embedding station 450, such as a hot plate as shown in FIG. 26, with the lids 120 removed or open. Continuing with the tissue embedding module 770, if the tissue processing module 760 was used, the fixing medium 118 (e.g., gel) of each compartment 112 may be colored (e.g., inked) with different colors to avoid mixing up the tissue samples 190. For example, compartments 1, 2 and 3 of each tissue sample cassette 100 may be inked with a red dot, a green dot and a black dot, respectively.

Once the gel 118 is warmed by the hot plate 450, the gel 118 may be gently trimmed (e.g., 2-4 mm) without touching the actual tissue samples 190 the trimmed gel 118 may be peeled off (e.g., with a tissue) and the remaining gel 118/ tissue sample 190 placed in an embedding mold 460 (e.g., metal mold). In aspects of the disclosure, the technician may trim the gel 118 further after peeling the originally trimmed gel 118. Continuing with the tissue embedding module 770, an embedding medium 472 (e.g., liquid paraffin) may be poured into the embedding mold 460 while ensuring that the tissue samples 190 are at a consistent level. For example, use of a pressor may be necessary to align the tissue samples 190 within the liquid embedding medium 472. In aspects of the disclosure, an orientation indicator 194 (e.g., a colored dot) may be disposed in the embedding mold 460 before the embedding medium 472 is added or added to the embedding medium 472 after being poured into the embedding mold 460. In aspects of the disclosure, the left upper corner of the tissue sample 190 may be used as an indicator.

Continuing with the tissue embedding module 770, if the tissue processing module 750 was used, then the embedding station 450 is not used as there is no gel medium. Instead, the tissue samples 190 may be transferred directly from the tissue sample cassettes 100 to the embedding mold 460, after which an embedding medium 472 (e.g., liquid paraffin) may be poured into the embedding mold 460 while ensuring that the tissue samples 190 are at a consistent level. For example, use of a pressor may be necessary to align the tissue samples 190 within the liquid embedding medium 472. In aspects of the disclosure, an orientation indicator 194 (e.g., a colored dot) may be disposed in the embedding mold 460 before the embedding medium 472 is added or added to the embedding medium 472 after being poured into the embedding mold 460. In aspects of the disclosure, the left upper corner of the tissue sample 190 may be used as an indicator.

Continuing with the tissue sample system 700, a tissue cutting module 780 may be used once the embedding medium 472 has hardened into a block 470 (e.g., paraffin block). As shown in FIG. 27, the block may be at least partially transparent and the orientation indicator 194 may be clearly seen on or within the embedding medium 472, whereas the indicators 192 and/or the orientation markers 752 of the tissue samples 190 may not be visible within the block 470. Thus, the orientation indicator 194 may provide the only visible mark of the orientation of the tissue samples 190 within the block 470. For example, the orientation indicator 194 may always be disposed in between two specific indicators 192 (e.g., between red and green dots), thus providing a consistent indication of how the tissue samples 190 are oriented when looking at the block 470.

Continuing with the tissue cutting module 780, the technician may visually inspect the block 470 with the embedded tissue samples 190 and gel 118 if tissue processing module 760 was used or with the embedded tissue samples 190 only if tissue processing module 750 was used. For example, the inspection of the block 470 may ensure that there are no cracks in the embedding medium 472 and that the tissue samples 190 are appropriately leveled. The embedding medium 472 may then be trimmed or cut and the remaining portion of the block 470 containing the tissue samples 190 may be mounted to a slide 510. In aspects of the disclosure, the tissue samples 190 may need to be placed close enough together during the tissue embedding module 770 in order to ensure that the tissue samples 190 fit on the slide 510. As shown in FIG. 27, the slide 510 may include a patient identifier 520. For example, the patient identifier 520 may be machine printed onto the slide 510 as text 522 and/or a bar/QRC code 524, where the bar/QRC code 524 may contain any suitable amount of patient data.

Continuing with the tissue sample system 700, a digital scanning and management module 790 may be used to scan the slides 510 with the mounted tissue samples 190 into the pathology information system 800 via a scanning system 500 as shown in FIG. 29. The scanned images may be saved as image files having file names based on information from the patient identifier 520 (e.g., bar/QRC code 524), after which the image files may then be accessed by authorized users of the pathology information system 800. For example, the image files may be analyzed by a pathologist for signs of disease (e.g., prostate cancer).

In aspects of the disclosure, the cassette identifier 140 (e.g., barcode) may be embedded in the tissue sample cassette 100 to ensure that the cassette identifier 140 is not lost or separated from the tissue sample cassette.

In aspects of the disclosure, the number of slides 510 required for a particular pathology examination is significantly fewer than the number of slides used in a typical pathology process. For example, a typical prostate pathology process may require twelve slides whereas a prostate pathology process using the tissue sample system 700 may only require four slides 510, which is significant in that each slide scan requires about 200 MB of memory storage in the system.

In aspects of the disclosure, the tissue samples 190 are kept intact and in correct orientation throughout the entire tissue sampling system 700 process, as opposed to typical pathology processes that require directly handling the tissue samples 190 one or more times and have no orientation markers or fixing processes to ensure proper orientation of the tissue samples 190 at any given step.

In aspects of the disclosure, the tissue samples 190 are tracked from the beginning with a cassette identifier 140, which minimizes or prevents mixing specific patient tissue samples 190 with other patient samples.

In aspects of the disclosure, only a single storage container 200 is needed for a complete set of tissue samples 190. For example, a typical prostate tissue sample set requires twelve jars with a single tissue sample per jar as opposed to having all twelve tissue samples 190 contained within four tissue sample cassettes 100 that all fit within one storage container 200 (e.g., jar 210 and lid 220).

In aspects of the disclosure, a standard tissue sample cassette 100 design and tissue sample system 700 may be consistently used by all medical practitioners, medical centers, hospitals and pathology labs, providing an efficient and accurate tissue sample process.

In aspects of the disclosure, a tissue sample cassette 100 may include a particular number of compartments 112 that correspond to a specific type of specimen. For example, a tissue sample cassette 100 having three compartments 112 may be used specifically for a prostate tissue sample process while a tissue sample cassette 100 having four compartments 112 may be used specifically for a gastrointestinal tissue sample process.

Although the disclosure has been described and illustrated with a certain degree of particularity, it is understood that the present disclosure has been made only by way of example, and that numerous changes in the combination and arrangement of parts can be resorted to by those skilled in the art without departing from the scope of the disclosure, as hereinafter claimed.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the disclosure so claimed are inherently or expressly described and enabled herein.

Thus, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, or operations in the processes or methods disclosed are illustrations of exemplary approaches. Based upon implementation preferences or scenarios, it is understood that the specific order or hierarchy of steps, operations or processes may be rearranged. Some of the steps, operations or processes may be performed simultaneously. In some implementation preferences or scenarios, certain operations may or may not be performed. Some or all of the steps, operations, or processes may be performed automatically, without the intervention of a user. Method claims may be provided to present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary and Brief Description of the Drawings are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in any claim. Rather, as the following claims reflect, inventive subject matter lies in less than all features of a single disclosed configuration or operation.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A method of processing pathology specimens, the method comprising:
   receiving a tissue sample cassette containing a plurality of tissue samples, each tissue sample disposed in a separate compartment of the tissue sample cassette and covered by a gel;
   scanning, by a receiving station of a pathology information system, a cassette identifier embedded on the tissue sample cassette;
   printing, by a cassette printer, a patient label on the tissue sample cassette based on information from the scanned cassette identifier;
   removing a lid from the tissue sample cassette;
   scanning, by a digital imaging system, the tissue sample cassette with the lid removed;

uploading, from the digital imaging system, a digital image of the scanned tissue sample cassette to a gross description module of the pathology information system;

color coding, for each tissue sample in the tissue sample cassette, one end of the gel covering the tissue sample a color and a second end of the gel covering the tissue sample a different color;

placing a sponge over the compartments and closing the lid of the tissue sample cassette;

placing the closed tissue sample cassette into a tissue processor to dehydrate contents of the tissue sample cassette;

removing the tissue sample cassette from the tissue processor;

removing the gel covered tissue samples from the removed tissue sample cassette;

trimming a portion of the gel from each tissue sample;

placing the trimmed tissue samples and an orientation indicator in an embedding mold;

covering the trimmed tissue samples and the orientation indicator within the embedding mold with liquid paraffin;

solidifying the liquid paraffin to create a paraffin block with the tissue samples and the orientation indicator embedded;

trimming the paraffin block;

mounting the trimmed paraffin block to a slide having a patient identifier;

scanning, with a scanning system, the slide to create a digital image of each tissue sample; and saving, by the pathology information system, the digital images as image files based on information from the patient identifier.

2. The method of claim 1, further comprising identifying each tissue sample of the plurality of tissue samples by a colored ink dot on the gel covering the tissue sample.

* * * * *